J. BIJUR.
BATTERY CONNECTION.
APPLICATION FILED SEPT. 6, 1913.
1,108,883.
Patented Sept. 1, 1914.
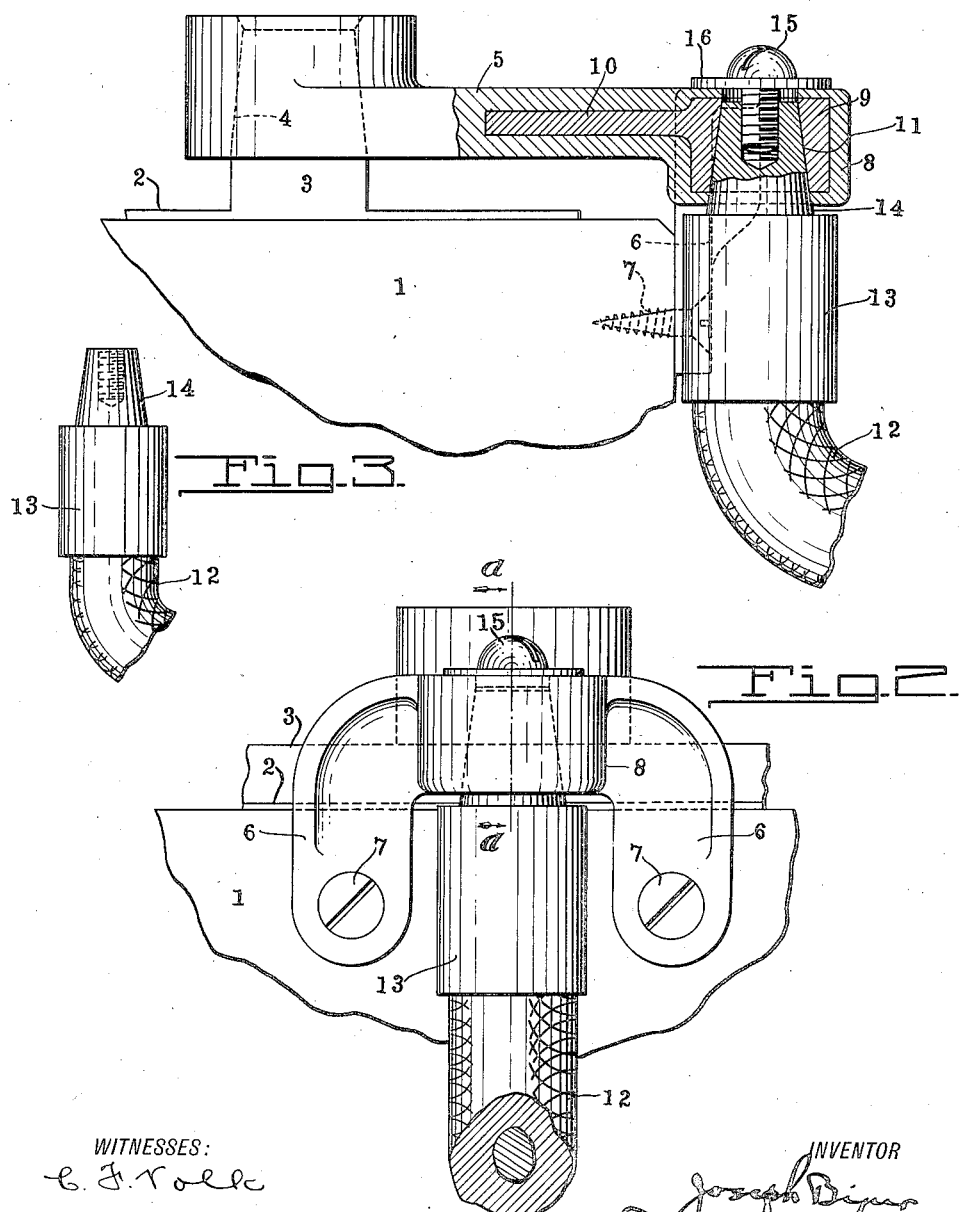

UNITED STATES PATENT OFFICE.

JOSEPH BIJUR, OF NEW YORK, N. Y., ASSIGNOR TO BIJUR MOTOR LIGHTING COMPANY, OF HOBOKEN, NEW JERSEY, A CORPORATION OF NEW YORK.

BATTERY CONNECTION.

1,108,883.  Specification of Letters Patent.  Patented Sept. 1, 1914.

Application filed September 6, 1913. Serial No. 788,415.

*To all whom it may concern:*

Be it known that I, JOSEPH BIJUR, a citizen of the United States, residing at New York, in the county of New York and State of New York, have invented certain new and useful Improvements in Battery Connections, of which the following is a full, clear, and exact description, such as will enable others skilled in the art to which it appertains to make and use the same.

This invention relates to electrical connections.

One of the objects thereof is to provide an electrical connection of durable construction and efficient action.

Another object is to provide a practical and cheap connection for storage-batteries which will reliably meet the hardest conditions of use and offer a low electrical resistance.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, in which is shown one of various possible embodiments of this invention, Figure 1 is a side elevation thereof, partially in section along the line $a$—$a$, Fig. 2; Fig. 2 is an end view of the parts shown in Fig. 1; and Fig. 3 is a detail elevation showing one of the parts removed from Fig. 1 upon a smaller scale.

Similar reference characters refer to similar parts throughout the several views of the drawing.

Referring now to Fig. 1 of the drawing, there is shown a storage-battery cell 1, providing an end plate 2 which is provided with a tapering projection 3. The term " end plate " is broadly used throughout this description and the claims to denote an electrical terminal portion of the battery. Fitted to this projection, by means of a suitable recess 4, and burned in position thereon, is a connecting member 5, preferably a lead casting. This member is provided with the spaced laterally extending arms 6 which rest upon the cell and are held in position, as by the screws 7. Connection 5 terminates in a lug 8, within which is positioned an insert 9 of relatively hard metal, as copper, which extends into the body of the connection, as at 10. The insert 9 and adjacent portions of the lug 8 are shaped to provide a tapering recess 11, which may extend in any desired direction.

By the tapered connection with the end plate of the cell, a close firm contact may be secured, even before the connecting member is burned in position, and the spaced arms 6 serve to prevent this connection from working loose or tending to rock or bend the end plate, even when the connection is provided, as hereinafter described, with a conductor, and even though the battery be mounted upon a railway carriage or motor vehicle and subjected to the most severe jarring and vibration.

A suitable conductor 12 is mechanically and electrically connected with a socket 13, provided with a tapering plug 14 adapted to rest within the recess 11. This plug is of such length that it extends beyond the larger end of recess 11, even when tightly fitted in position, and is drawn into an intimate contact by means of a screw 15, tapped within its free end and bearing against the adjacent surfaces of the lug 8 through a washer 16.

The action of this apparatus may be to a large extent clear from the above, but it may be noted that the hard insert 9 furnishes a bearing surface for the removable plug, which will permit the latter to be drawn tightly into position without undue wear and which will preserve a smooth surface for contact. The plug, moreover, is readily connected or disconnected, and the wedging action as it is drawn in place not only tends to maintain the surfaces clean, but results in an extremely high pressure of contact. The electrical connection is thus of low resistance at this point, and due to the relatively large surface of contact between the insert 9 and the lead casting in which it is positioned, a heavy current may be led into the plate without tendency to heat the parts. The mechanical construction, moreover, is equally secure, for, although readily detachable, the plug when in position acts virtually as a portion of the connecting member 5, and the latter is securely braced by its lateral arms 6, as above described, and is thus well adapted to withstand any swaying of the connecting conductor or vibration of the parts. It will thus be seen that there is provided apparatus in which the objects of this invention are achieved and which is well suited to withstand severe practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In apparatus of the class described, in combination, a battery cell having an end plate, a metallic connecting member secured to said end plate and provided with a supporting arm diverging therefrom in rigid relation thereto and resting against said cell, and a conductor secured to said connecting member independently of said supporting arm.

2. In apparatus of the class described, in combination, a battery cell having an end plate, a metallic connecting member secured to said end plate and provided with a pair of spaced arms resting against said cell, and a conductor secured to said connecting member.

3. In apparatus of the class described, in combination, a battery cell having an end plate, a metallic connecting member secured to said end plate and provided with a pair of transversely extending relatively spaced arms resting against said cell and adapted to support said member against rocking, and a conductor secured to said connecting member.

4. In apparatus of the class described, in combination, a battery plate, a connecting member secured thereto having a recess therein, and an insertion of relatively hard metal exposed in the inner walls of said recess, and a conductor secured within said recess and fitting against said hard metal.

5. In apparatus of the class described, in combination, a battery end plate having a tapered projection, a metallic connecting member having a recess into which said projection fits and is permanently secured and a second recess, said member comprising an insert of relatively hard metal exposed in the inner walls of said second recess, and a conductor secured within said second recess and resting against said hard metal.

6. In apparatus of the class described, in combination, a battery plate, a connecting member secured thereto having a recess therein and an insertion of relatively hard metal exposed in the inner walls of said recess, a conductor having a tapered portion fitted within said recess in contact with said hard metal, means connected with said tapered portion and extending through and beyond said recess and means coacting therewith to seal the end of said recess through which it projects.

7. In apparatus of the class described, in combination, a storage battery, a metallic member secured to a portion of said battery and electrically connected therewith a conductor leading from said battery and a member secured to said conductor, one of said members having a tapering recess and the other having a tapering projection removably fitting in said recess and said member connected with said battery having a relatively hard metallic insert positioned and exposed to bear against the coacting portion of said other member.

8. In apparatus of the class described in combination, a storage battery, a conductor leading from said battery a metallic member secured to and electrically connected to a portion of said battery independently of said conductor and having a tapering recess therein, a member secured to said conductor and fitting within said recess, and means having a threaded connection with said part within said recess extending beyond said first member and bearing thereon and adapted to draw said first member within said recess.

9. In apparatus of the class described in combination, a storage battery, a metallic member secured to and electrically connected to a portion of said battery, said member having a tapering recess extending therethrough and being provided with an insert of relatively hard metal exposed within the inner surface of said recess, a conductor leading from said battery, a member secured to said conductor shaped to fit said recess and bear against said hard metal insert and means adapted to secure said member within said recess.

10. In apparatus of the class described in combination, a storage battery, a member rigidly secured to a portion of said battery and electrically connected therewith and having a tapering recess extending therethrough, a relatively hard metallic insert within said member exposed throughout said recess, an insulated conductor leading from said battery, a metallic member electrically connected with the end of said conductor and provided with a tapering projection shaped to fit within said recess and rest against said metallic insert, a screw threaded within said projecting portion and extended through said recess and provided with means bearing upon the side of said first member remote from said conductor.

11. In apparatus of the class described, in combination, a storage-battery, an insulated conductor, a connecting member mounted upon a portion of said battery independently of said conductor and electrically connected therewith and having a tapered recess, a member electrically and mechanically secured to an end of said conductor and provided with a tapered portion shaped to fit said recess and removably fitted therein, and means interposed between said first member and said tapered portion adapted to force said tapered portion within said recess.

12. In apparatus of the class described, in combination, a battery connecting member having a tapering recess and provided with an insert of relatively hard metal exposed in the inner walls of said recess, a conductor, and a member secured to said conductor and fitting within said recess in contact with said hard metal.

13. In apparatus of the class described, in combination, a cell having an end plate, a metallic connecting member secured to said end plate and having a tapering recess formed therewith and provided with a supporting arm diverging therefrom in rigid relation thereto and resting against said cell, a conductor, and a member secured to said conductor and fitted within said recess.

14. In apparatus of the class described, in combination, a battery connecting member having a tapering recess and provided with an insert of relatively hard metal exposed in the inner walls of said recess, a conductor, and a member secured to said conductor and secured within said recess, said connecting member being provided with a pair of spaced arms resting against the battery cell.

In testimony whereof I affix my signature, in the presence of two witnesses.

JOSEPH BIJUR.

Witnesses:
R. S. BLAIR,
C. J. KULBERG.